United States Patent
Newman

(10) Patent No.: US 7,937,180 B2
(45) Date of Patent: May 3, 2011

(54) METHODS AND SYSTEMS FOR ASCERTAINING WEB CUTTING LOCATIONS

(75) Inventor: Jonathan Newman, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2307 days.

(21) Appl. No.: 10/704,482

(22) Filed: Nov. 7, 2003

(65) Prior Publication Data
US 2005/0102053 A1    May 12, 2005

(51) Int. Cl.
G06F 19/00    (2011.01)
(52) U.S. Cl. ........ 700/125; 101/485; 358/1.15; 400/593
(58) Field of Classification Search ............ 700/122, 700/124, 125; 400/593; 101/485; 358/1.18, 358/1.15; 83/13, 76.8
See application file for complete search history.

(56) References Cited

U.S. PATENT DOCUMENTS

| | | | |
|---|---|---|---|
| 3,948,125 A | 4/1976 | Hujer et al. | |
| 4,167,345 A * | 9/1979 | Englund et al. | 400/588 |
| 4,506,824 A | 3/1985 | Bartz | |
| 5,072,639 A | 12/1991 | Dolf | |
| 5,531,530 A * | 7/1996 | Kuramoto et al. | 400/593 |
| 6,196,098 B1 * | 3/2001 | Hagiwara et al. | 83/79 |
| 6,650,433 B1 * | 11/2003 | Keane et al. | 358/1.15 |
| 6,820,526 B1 * | 11/2004 | Maddalon | 83/76.8 |
| 6,874,420 B2 * | 4/2005 | Lewis et al. | 101/485 |
| 6,976,797 B2 * | 12/2005 | Herron | 400/61 |
| 7,182,007 B2 * | 2/2007 | Berge et al. | 83/13 |
| 7,495,796 B2 * | 2/2009 | Keane et al. | 358/1.18 |
| 2002/0020267 A1 | 2/2002 | Beggiao | |
| 2002/0180837 A1 | 12/2002 | McIntyre et al. | |
| 2004/0046788 A1 * | 3/2004 | Keane et al. | 345/748 |
| 2004/0163562 A1 * | 8/2004 | Lewis et al. | 101/485 |

OTHER PUBLICATIONS

Search Report for European Patent Application No. EP04256779. Search completed Mar. 4, 2005.

* cited by examiner

*Primary Examiner* — Ramesh B Patel
*Assistant Examiner* — Douglas S Lee

(57) ABSTRACT

In one embodiment, a method comprises storing information in a database that describes cutting locations on a web upon which multiple images are printed; embedding, in an area on the web, a key into the database; and using the key to ascertain, from the database, the cutting locations.

21 Claims, 5 Drawing Sheets

METHODS AND SYSTEMS FOR ASCERTAINING WEB CUTTING LOCATIONS

BACKGROUND

When printing on a continuous roll of media, referred to by some as a "web", a challenge is presented that pertains to determining where to cut the media in both x and y directions to extract the content that is printed upon the media. For example, a continuous web may have several differently-sized images, such as photographs, printed on it and which are eventually to be singulated or cut into individual images or photographs. The series of images are usually arranged in what is known as a "spread". A spread comprises a logical group of one or more images. Each spread can contain images for one or more customer orders. Thus, it is desirable to know the locations of the images. It is also desirable to be able to layout the images relative to the web in a manner that makes efficient use of the web.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Overview

The methods and systems about to be described provide an efficient approach for determining cutting locations on a web, also referred to as a web-based print roll. This approach can reduce the amount of media that might otherwise be wasted by conventional approaches. In the discussion that follows, a web is described as having one or more images printed thereon. The series of images are usually arranged in what is known as a "spread", where a spread comprises a logical group of one or more images. Each web can contain one or more spreads, and each spread can contain images for one or more customer orders.

In one embodiment, a database is used to store cutting locations where the web is to be cut to singulated objects printed on the web. A key to the database is embedded on the web and enables the system to access the database and determine the cutting locations. This approach is very efficient because, in some embodiments, data regarding cutting locations for multiple images can be made accessible by scanning a single key embedded on the web.

In another embodiment, data can be printed in a single area on the web. Multiple images are also printed on the web. The data can be used to ascertain x and y cutting locations for the multiple images. The location of the printed data is, in this embodiment, independent of the cutting locations for at least a closest adjacent image. In other words, the location does not physically define, for at least a closest adjacent image, a cutting location. This approach makes efficient use of the media because there is no need for data to be printed in multiple locations upon the media. This leaves additional room for the images themselves and helps to more optimally use the real estate of the web holding the images

Exemplary Printer System

Figure 1:
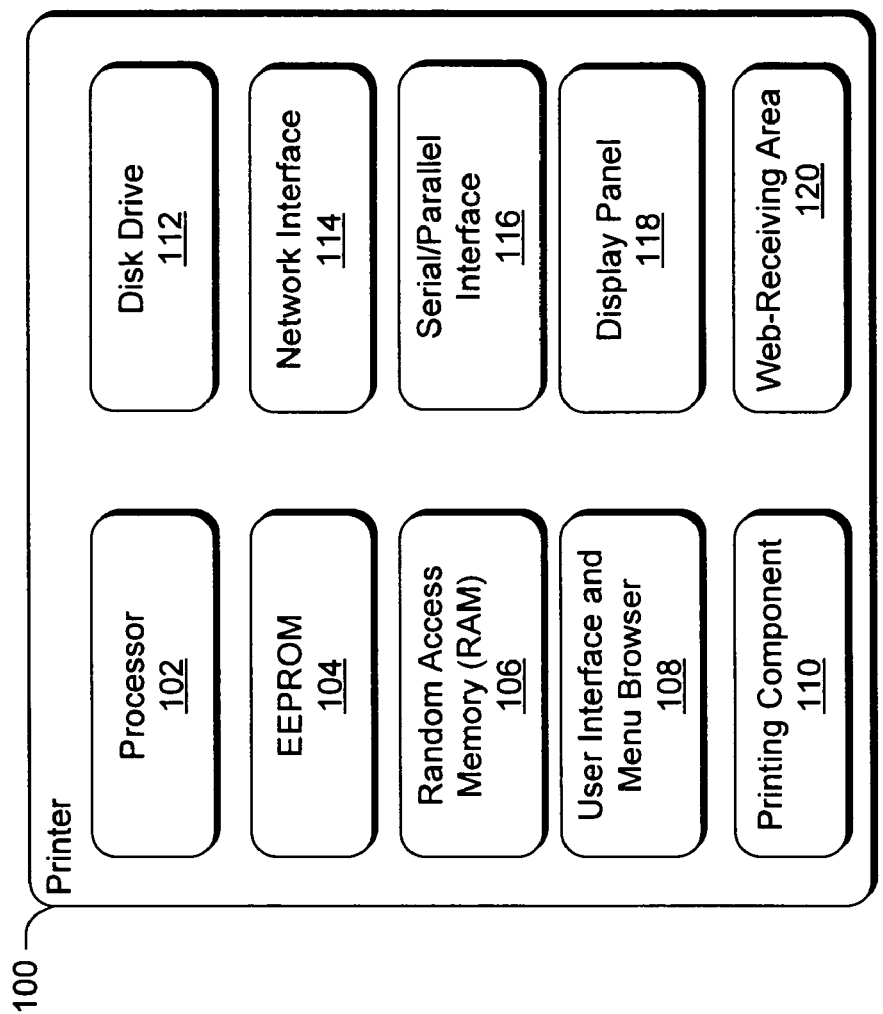
FIG. 1 is a block diagram of an exemplary printer in accordance with one embodiment.

For purposes of understanding various structures associated with an exemplary printing device, consider FIG. 1.

FIG. 1 is a block diagram showing exemplary components of a printing device in the form of a printer 100 in accordance with one embodiment. It will be appreciated and understood that the illustrated printing device constitutes but one exemplary printing device and is not intended to be limiting in any way. Accordingly, other printing devices can be used in connection with the inventive techniques and systems described herein. These other printing devices can have components that are different from those described immediately below.

Printer 100 includes a processor 102 and can include an electrically erasable programmable read-only memory (EEPROM) 104 and a random access memory (RAM) 106. Processor 102 processes various instructions utilized to operate the printer 100 and communicate with other devices. EEPROM 104 and RAM 106 store various information such as configuration information, fonts, templates, data being printed, and menu structure information. Although not shown in FIG. 1, a particular printer may also contain a ROM (non-erasable) in place of or in addition to EEPROM 104. Furthermore, a printer may alternatively contain a flash memory device in place of or in addition to EEPROM 104.

Printer 100 can also include a disk drive 112, a network interface 114, and a serial/parallel interface 116. Disk drive 112 provides additional storage for data being printed or other information used by the printer 100. Although both RAM 106 and disk drive 112 are illustrated in FIG. 1, a particular printer may contain either RAM 106 or disk drive 112, depending on the storage needs of the printer. For example, an inexpensive printer may contain a small amount of RAM 106 and no disk drive 112, thereby reducing the manufacturing cost of the printer. Network interface 114 provides a connection between printer 100 and a data communication network. Network interface 114 allows devices coupled to a common data communication network to send print jobs, menu data, and other information to printer 100 via the network. Similarly, serial/parallel interface 116 provides a data communication path directly between printer 100 and another device, such as a workstation, server, or other computing device. Although the printer 100 shown in FIG. 1 has two interfaces (network interface 114 and serial/parallel interface 116), a particular printer may only contain one interface.

Printer 100 also includes a printing component 110 that includes mechanisms that are arranged to selectively apply material (e.g., liquid ink, toner, etc.) to a print media (e.g., paper, plastic, fabric, photographic paper, etc.) in accordance with print data within a print job. Thus, for example, printing component 110 can include a conventional laser printing mechanism that selectively causes toner to be applied to an intermediate surface of a drum or belt. The intermediate surface can then be brought within close proximity of a print media in a manner that causes the toner to be transferred to the print media in a controlled fashion. The toner on the print media can then be more permanently fixed to the print media, for example, by selectively applying thermal energy to the toner. Printing component 110 can also be configured to support duplex printing, for example, by selectively flipping or turning the print media to allow printing on both sides. Printing component 110 can also include an inkjet printing device, such as those that are used to print photographs and the like.

Those skilled in the art will recognize that there are many different types of printing components available, and that for the purposes of the present invention, printing component 110 can include any of these various types.

Printer 100 also contains a user interface/menu browser 108 and a display panel 118. User interface/menu browser 108 allows the user of the printer to navigate the printer's menu structure. User interface 108 may be a series of buttons, switches or other indicators that are manipulated by the user of the printer. Display panel 118 is a graphical display that provides information regarding the status of the printer and the current options available through the menu structure.

Printer 100 also contains, in various embodiments, a web-receiving area 120 to receive a web-based roll for printing. A web is a continuous roll of media to be printed upon. Examples of the types of media that can be accommodated by printer 100 include paper, plastic, fabric, photographic paper, etc. As print jobs are processed by printer 100, the leading edge of the web is fed past web-receiving area 120 to printing component 110.

In the discussion above and below, certain aspects of the described embodiments can be implemented in terms of software instructions that reside on a computer-readable media. These instructions, when executed by a computer or processor, are configured to implement a designed functionality. This functionality will be described in this document in flow chart form.

Exemplary System for Web Printing and Cutting

In accordance with one embodiment, a web, as described above in relation to FIG. 1, is fed into a single component which performs both printing and cutting functions. It is to be understood that other embodiments might use two or more components to perform the printing and cutting functions. Examples of commercially-available web printers are the HP Indigo Press w3200, HP Indigo Press ws2000, and HP Indigo Press ws4000. It is to be understood that other products can be used in conjunction with the concepts herein.

Figure 2:
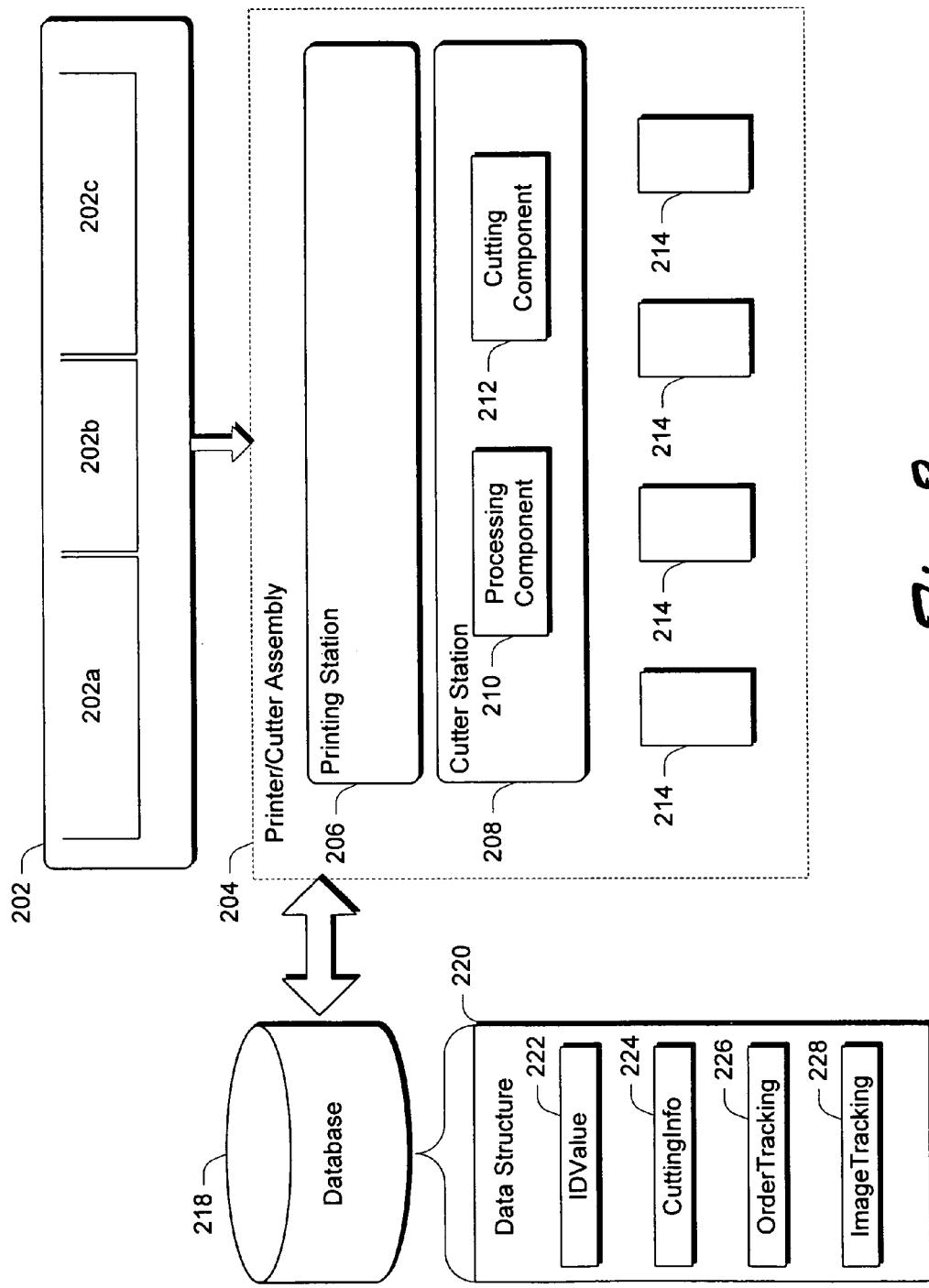
FIG. 2 is a block diagram showing exemplary components of a system in accordance with one embodiment.

FIG. 2 shows one such single component in accordance with one embodiment, generally at 204. Here, a web 202 is fed into a printer/cutter assembly 204. In one embodiment, a database 218, remote from the web, is provided and is accessed in order to determine cutting locations for the spread or web. That is, notice that web 202 comprises areas 202a, 202b and 202c. Assume that these areas constitute individual areas in which individual respective images are to be printed. Database 218 can store cutting locations for the individual images that are to be printed on the web by printing station 206. Then, when the web advances to cutter station 208, the web can be cut in the locations ascertained from the database to provide individual singulated images such as those shown at 214.

In one embodiment, a data structure 220 can be utilized to contain information relevant to one or more spreads, including cutting locations. Output from printer/cutter assembly 204 is in the form of individual images 214 which have been separated both from other images and from any excess material of web 202.

Printer/cutter assembly 204 comprises, in this embodiment, a printing station 206 and a cutting station or cutter 208. The printing station can have components that are the same as or different from those shown and described in relation to FIG. 1. The printing station 206 is configured to print multiple images upon web 202. In accordance with one or more of the embodiments described herein, the printing station is also configured to print one or more scannable objects on the web. In accordance with one or more embodiments, the scannable object(s) indicate the cutting locations for the multiple images. The cutting locations constitute those locations that are to be cut in order to singulate the web into multiple different images. For example, assume that a particular spread comprises ten photographs. The cutting locations would then constitute those locations that are to be used to cut or singulate the web into individual photographs.

The actual locations of the cutting locations can be determined in any suitable way. For example, as the individual images are arranged in a layout by the printer's (or other computing device's) software, hardware and/or firmware, the data can be processed such that a scannable object(s) can be printed onto the web and later used to ascertain the cutting locations. For example, the layout process can define the x and y coordinates for the particular images. By knowing the x and y coordinates for all of the images on a web, the layout process, by definition, knows the x and y coordinates of the cutting locations, i.e. those locations between and/or adjacent the laid out images. The scannable object can comprise any suitable object having any suitable configuration. As those skilled in the art will appreciate, the scannable object can comprise various forms, including, but not limited to, optical character recognition (OCR) marks, bar codes, punch marks, I-marks, color I-marks, and various technologies used for fingerprint scanning, and the like.

In addition, the scannable object can be embodied on the web in any suitable location. In accordance with one embodiment, the scannable object can be printed proximate a leading edge of one or more spreads. Thus, in this specific embodiment, the object would lie between one or more images of the spread and the leading edge, with no images of the spread between the object and the leading edge. In another embodiment, the scannable object can be printed proximate a trailing edge of one or more spreads.

In accordance with one embodiment, cutter station 208 comprises a processing component 210 which reads the scannable object and a cutting component 212 that utilizes cutting locations gleaned from the scannable object to effectively cut or otherwise singulate the web into individual portions that, in some embodiments, can constitute individual photographs. One specific implementation of a processing component 210 is described below in connection with FIG. 3.

In one embodiment, the FIG. 2 system comprises a database 218, as noted above, that can be utilized to store data that are organized in data structures, such as the one shown at 220. In at least some embodiments, the data that can be stored in the database in the various data structures comprises the cutting locations for one or more spreads, that are to be utilized by the cutting component 212 to cut the web. Here, the scannable object associated with the web can be utilized as a key into the database to access the cutting locations. Thus, in these embodiments, system 204 can access database 218 by using the key embedded on the web. System 204 can then ascertain the cutting locations which are stored in the database. In some embodiments, access to the database is effectuated via the processing component 210.

In accordance with one embodiment, data structure 220 can contain an ID value portion 222 that stores at least one ID value. Each ID value can represent an individual spread. Data structure 220 can also include a cutting information portion 224 which stores x and y cutting locations for the spread associated with a particular ID value. Data structure 220 can also include other useful information. For example, in one specific embodiment, the data structure 220 can also include an order tracking portion 226 and an image tracking portion 228. The order tracking portion identifies at least one customer order associated with one or more spreads. So, for example, for a particular spread, the order tracking portion can indicate which customer orders appear on that spread (e.g. spread #1 contains images for customers A, B, and C). The image tracking portion identifies an associated customer order for at least one of the multiple images of the spread. So, for example, for a particular spread, the image tracking portion can indicate to whom the individual images of the spread belong (e.g. images 1 and 2 belong to customer A, images 3, 4 and 5 belong to customer B and the like).

Once the system 204 has determined the cutting locations by, for example, accessing the database 218 and its associated data structures, cutting component 212 can perform at least one cut based on the cutting location(s). In one embodiment, in order to facilitate order tracking, cutting component 212 updates database 218 with a flag indicating that the spread has been seen and cut by cutting component 212. This facilitates order tracking internally within the system for maintaining the state of the spread. For example, in an event of a paper jam, those spreads that have been cut by the system need not be reprinted. However, for those spreads that have not yet already been cut, reprinting may be desirable. The flag can also form the basis of user notifications that can be generated to inform the user or operator of the state of the printing process.

Exemplary Apparatus for Reading Data

Figure 3:
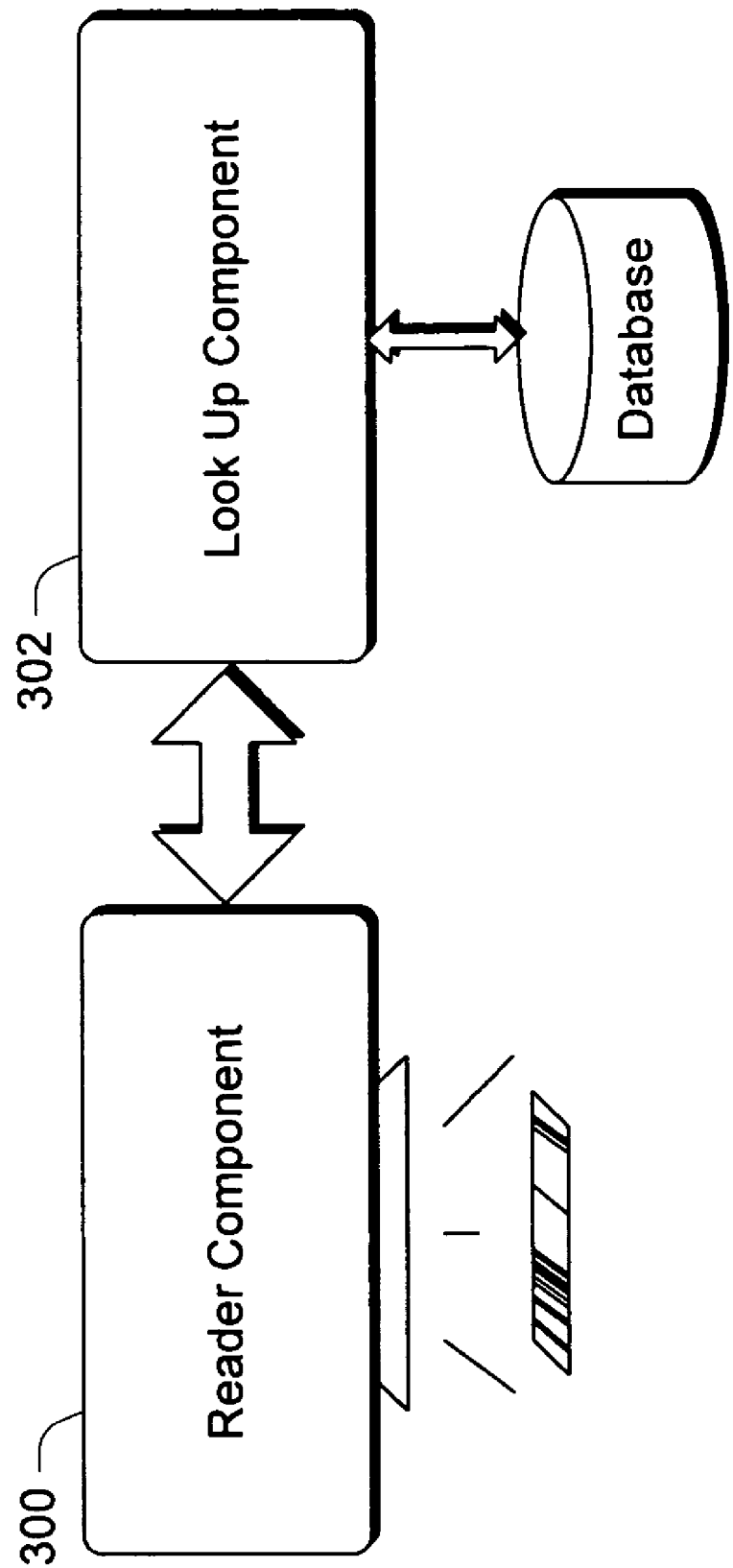
FIG. 3 is a block diagram of an exemplary apparatus in accordance with one embodiment.

FIG. 3 shows components of an apparatus, in accordance with one embodiment, that is configured to read data printed on a web (such as the scannable object discussed above in relation to FIG. 2) and to ascertain at least one cutting location from such data. The apparatus of FIG. 3 can be implemented in any suitable hardware, software, firmware or combination thereof. In some embodiments, the apparatus of FIG. 3 can be embodied in a processing component that comprises part of cutter 208 (FIG. 2), such as processing component 210 (FIG. 2).

Here, a reader component 300 is provided and reads data printed on web 202 (FIG. 2). In this example, data in the form of a scannable object appears just beneath the reader component. A look up component 302 is operably associated with the reader component and uses the data to look up at least one cutting location. In one embodiment, the look up component accesses a database as is shown in the Figure. In one specific embodiment, the apparatus takes the form of a bar code reader. As those skilled in the art will appreciate, however, a bar code reader is but one way to implement this feature and is not intended to limit application of the claimed subject matter.

Exemplary Web

Figure 4:
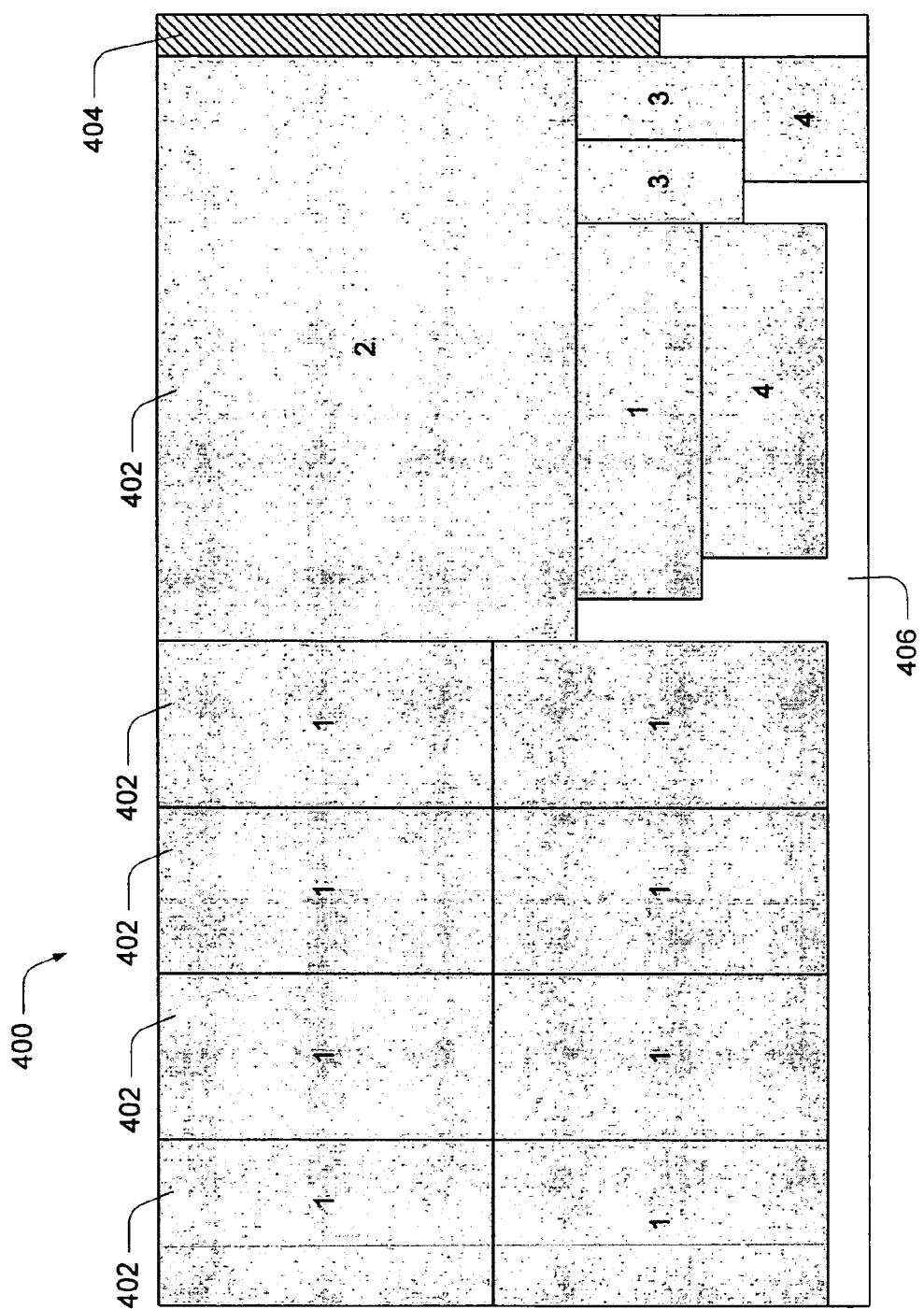
FIG. 4 is a block diagram of an exemplary spread in accordance with one embodiment.

FIG. 4 shows a portion of an exemplary web for use in accordance with one embodiment. As noted above, the web can contain one or more spreads. Each spread can consist of a series of images that belong to one or more customer orders. One spread is shown generally at 400 having multiple images 402 printed thereon. Only a few of the multiple images of spread 400 are designated at 402.

As illustrated in FIG. 4, the printed images 402 may, but need not necessarily, differ in size. The numerals within the printed images 402 represent exemplary customer orders associated with each image. For example, all images marked with a "1" belong to the first customer order, all images marked with a "2" belong to the second customer order, and so forth. In one specific embodiment, the images are photographs. Unused space on the web is shown at 406.

In addition to the multiple images 402, at least one object 404 is printed on the web. In one specific embodiment, the object 404 takes the form of a bar code. Those skilled in the art will appreciate, however, that the object 404 can take other forms. As noted above, object 404 can comprise OCR marks, punch marks, I-marks, color I-marks and the like. As noted above in the discussion of FIG. 2, object 404 can appear at any suitable location on the web. In this particular example, object 404 is placed in a location proximate a leading or trailing edge of an associated spread. In addition, object 404 can be associated with multiple spreads that appear on the web. In one embodiment, the object 404 acts as a key into database 218 (FIG. 2) that describes cutting locations for one or more spreads. In other embodiments, cutting locations can be determined merely from scanning the object, without reference to any external resource. For example, the data embodied in the object can itself describe the cutting locations, e.g. cutting location 1: x=0 to x=4 (i.e. the web is to be cut from a web location where x=0 to a web location where x=4); cutting location 2: y=0.5 to y=4 (i.e. the web is to be cut from a web location where y=0.5 to a web location where y=4); and so on.

It is to be appreciated and understood that while the location of object 404 on the web may coincide with a physical cutting location on the web, in some embodiments, the location of the object 404 is not intended to define a physical cutting location for purposes of cutting the web. In other words, while one or more cutting locations may, in some embodiments, be specified relative to the object, the object need not be placed at a specific location on the web in order to define the cutting location.

Once cutting operations are performed on this exemplary spread 400, images will be separated from each other and the unused space 406. From there, images may be sorted by customer order, if desired.

Exemplary Method

Figure 5:
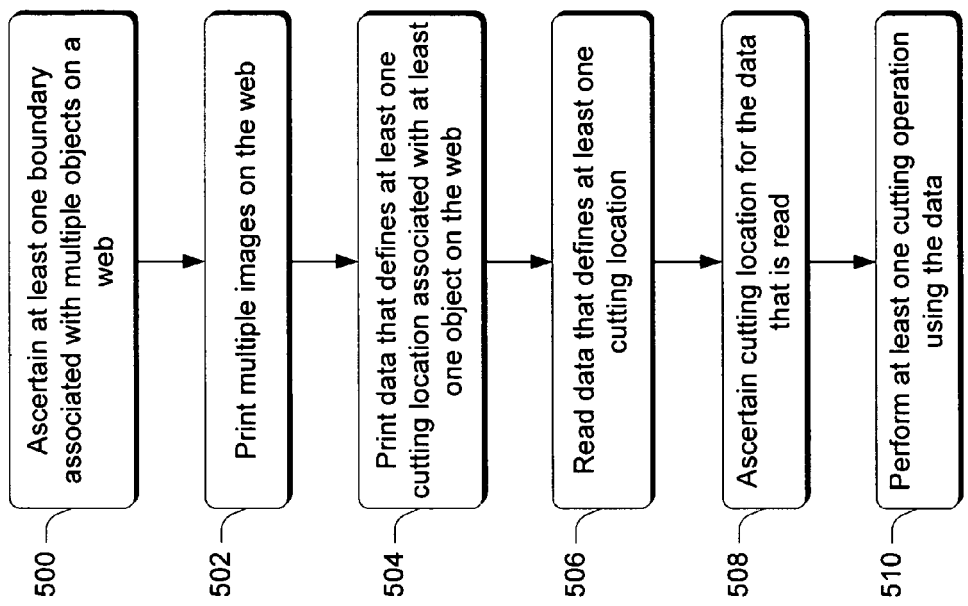
FIG. 5 is a flow diagram that describes steps in a method in accordance with one embodiment.

FIG. 5 is a flow diagram that describes steps in a method in accordance with one embodiment. The method can be implemented in any suitable hardware, software, firmware or combination thereof. In one embodiment, the method about to be described can be implemented in connection with a system such as the one shown and described in relation to FIG. 2.

Step 500 ascertains at least one boundary associated with multiple objects on a web. The boundaries can comprise those boundaries that define the edges of individual images as well as the edges of the web. This step can be implemented by the hardware, software and/or firmware that is utilized in laying out a particular spread or spreads. Methods of ascertaining a boundary are well-known to those of ordinary skill in the art. In one embodiment, this information is stored in a database, such as database 218 (FIG. 2).

Step 502 prints the multiple images on a web utilizing boundary data ascertained in step 500. This step can be implemented by a printer, such as one that is utilized at a printing station such as the one shown at 206 in FIG. 2. The images that are printed can define one or more spreads.

Step 504 prints data that defines at least one cutting location associated with at least one object on the web. The data can be printed in any suitable location on the web and can utilize the boundary data ascertained in step 500. In one embodiment, the data can be printed in a single area of the web in a location that, for at least a closest adjacent image, does not physically define a cutting location. In one embodiment, the data is specifically printed in an area proximate at least one of a leading or trailing edge of a spread. The data could take the form of a bar code or other scannable object. In one embodiment that utilizes database 218 (FIG. 2), the data acts as a key into the database.

Step 506 reads data that defines at least one cutting location. In the case of a bar code, for example, this step can be performed by a bar code reader. Step 508 ascertains at least one cutting location for the data. In one embodiment, both x and y cutting locations are ascertained. The data can be used as a key or index into a database to ascertain the cutting locations, as described above. Alternately or additionally, the data itself can describe the cutting locations. Step 510 performs at least one cutting operation based on the information ascertained from the data.

Conclusion

The methods and systems described above provide an efficient approach to determining cutting locations on a web-based print roll. This approach can reduce the amount of media that might otherwise be wasted by conventional approaches and leaves more room for the images themselves.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
storing information in a database that describes cutting locations along a length of a generally continuous web upon which multiple images are printed, wherein the cutting locations designate multiple spreads of the respective multiple images and each spread defines a series of at least some of the different images;
embedding, in an area on the generally continuous web, a key into the database; and
ascertaining, via use of the key and the database, the cutting locations on the generally continuous web for the respective images according to the multiple spreads.

2. The method of claim 1, wherein storing information in a database comprises storing information that describes x and y cutting locations.

3. The method of claim 1, wherein at least one of the multiple images differs in size from at least one other of the multiple images.

4. The method of claim 1, wherein embedding the key comprises embedding the key proximate a leading edge relative to one of the cutting locations.

5. The method of claim 1, wherein embedding the key comprises embedding the key proximate a trailing edge relative to one of the cutting locations.

6. The method of claim 1, wherein embedding the key comprises printing a scannable object on the web, and wherein using the key comprises, at least in part, scanning the scannable object.

7. The method of claim 1, comprising:
cutting the web using the cutting locations.

8. The method of claim 1, wherein each spread contains at least some of the images for a customer order, and wherein individual customers associated with the customer orders can vary from spread to spread.

9. A method comprising:
storing information in a database that describes an array of cutting locations relative to a generally continuous web upon which multiple images are printed, wherein the multiple images are arranged in multiple spreads with each respective spread defining a separate logical group of images, at least one of the images being a photograph;
embedding, on at least one of a leading or trailing edge of each respective spread, a key into the database; and
accessing, with the key of each respective spread, the information in the database to ascertain the cutting locations on the generally continuous web for the respective images according to the multiple spreads.

10. The method of claim 9, wherein storing information comprises storing information that describes x and y cutting locations.

11. The method of claim 9, wherein at least one of the multiple images differs in size from at least one other of the multiple images.

12. The method of claim 9, wherein embedding the key comprises printing a scannable object.

13. The method of claim 9, wherein embedding the key comprises printing a scannable object in the form of a bar code.

14. The method of claim 9, comprising cutting the web using the cutting locations.

15. A computer-readable medium having stored thereon a data structure comprising:
an ID value portion that stores one or more ID values, with each individual ID value being associated with a different individual spread on which images are printed;
a cutting information portion associated with each ID value portion, the cutting information portion storing cutting information that describes x and y cutting locations for each spread associated with a particular ID value;
an order tracking portion which identifies multiple customer orders associated with a spread; and
an image tracking portion which identifies, for at least one of multiple images of the spread, an associated customer order from the multiple customer orders.

16. A printer comprising:
a web-receiving area configured to receive a web that embodies multiple printed images;
at least one printing component that is configured to print upon the web, the at least one printing component being configured to print:
multiple images defining at least one spread on a web; and
one or more scannable objects on the web that are each configured to store information to ascertain, from a location remote from the web, at least one cutting location on the web for the multiple images.

17. The method of claim 16, wherein the printer is further configured to print a scannable object on the web proximate a leading edge relative to one of the cutting locations.

18. The method of claim 17, wherein the scannable object comprises a bar code.

19. The method of claim 16, wherein the printer is further configured to print a scannable object on the web proximate a trailing edge relative to one of the cutting locations.

20. A system comprising:
a printer including:
a web-receiving area configured to receive a generally continuous web that embodies multiple printed images; and
at least one printing component that is configured to print upon the generally continuous web, the at least one printing component being configured to print:
multiple images defining an array of spreads on the generally continuous web; and
one or more scannable objects on the generally continuous web that are configured to ascertain, from a location remote from the web, at least one cutting location for the multiple images; and
a database including:
one or more computer-readable media comprising:
an ID value field configured to store at least one ID value associated with a respective one of the spreads on which images are printed; and
a cutting information field configured to store cutting information, the cutting information comprising at least one cutting location for the respective spread associated with a particular ID value.

21. The system of claim 20, wherein the system further comprises a cutter comprising:

a processing component configured to use data, printed in a single area on the generally continuous web upon which multiple images are printed, to ascertain at least one cutting location for at least one of the multiple images, wherein the data is printed on the generally continuous web in a location that, for at least a closest adjacent image, does not physically define, for purposes of performing a cutting operation, a cutting location; and a cutting component configured to perform at least one cut based on the cutting location ascertained from the data.

* * * * *